United States Patent
Goerth et al.

[15] 3,665,029
[45] May 23, 1972

[54] PRODUCTION OF O-AMINOBENZONITRILES

[72] Inventors: Helmut Goerth, Ludwigshafen; Herbert Armbrust, Gruenstadt, both of Germany

[73] Assignee: Badische Anilin & Soda-Fabrik Aktiengesellschaft, Ludwigshafen/Rhine, Germany

[22] Filed: June 23, 1969

[21] Appl. No.: 835,744

[30] Foreign Application Priority Data

June 29, 1968 Germany......................P 17 68 786.4

[52] U.S. Cl..........................260/465 E, 260/141, 260/310, 260/325, 260/999
[51] Int. Cl.......................................C07c 121/78
[58] Field of Search...............................260/465 E

[56] References Cited

UNITED STATES PATENTS 3,374,262  3/1968  Seefelder et al.....................260/465

OTHER PUBLICATIONS

Bedford et al. S. Chem. Soc. (London) pp. 1633– 1634 (1959).

*Primary Examiner*—Joseph Rebold
*Assistant Examiner*—Dolph H. Torrence
*Attorney*—Johnston, Root, O'Keeffe, Keil, Thompson & Shurtleff

[57] ABSTRACT

Production of o-aminobenzonitriles by thermal decomposition of isatin β-oximes in the presence of basic compounds. The new products are starting materials for the production of dyes and pesticides.

8 Claims, No Drawings

PRODUCTION OF O-AMINOBENZONITRILES

The invention relates to a process for the production of o-aminobenzonitriles by thermal decomposition of isatin β-oximes in the presence of basic compounds.

It is known from the J. Chem. Soc. (London) 1633 et seq. (1959) that o-aminobenzonitriles can be prepared by decomposition of isatin β-oximes at from 200° to 300° C. At these high temperatures the reaction can only be controlled with difficulty if at all, only small amounts of starting material can be reacted at a time, the yields are unsatisfactory and the process cannot be carried out economically on an industrial scale. It has therefore been proposed in U.S. Pat. specification No. 3,374,262 that isatin β-oxime should be heated under subatmospheric pressure and in the presence of inert solvents or diluents so that the o-aminobenzonitrile formed immediately distils off. This method can be carried out with better yields on a large scale but it has disadvantages. It requires special apparatus, and reaction temperatures of from 200° to 400° C. are given. In addition considerable amounts of solvent or diluent are necessary in this method. The carbon dioxide formed in the reaction disturbs considerably the setting up of the subatmospheric pressure necessary for the distillation and considerable amounts of the o-aminobenzonitrile formed may be entrained, which often results in stoppages in the apparatus and disturbances in operation. Avoiding these difficulties (pressure regulation, installation of separators, cleaning of the plant) makes the process more expensive.

It is an object of this invention to provide a new process for the production of o-aminobenzonitriles which is easier and more economical to carry out and gives good yields of high purity product.

This and other objects are achieved and o-aminobenzonitriles having the general formula:

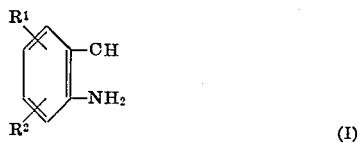

where the radicals $R^1$ and $R^2$ may be identical or different and each denotes a hydrogen atom, a halogen atom or an aliphatic radical are obtained advantageously by thermal decomposition of isatin β-oximes by decomposing an isatin β-oxime having the general formula:

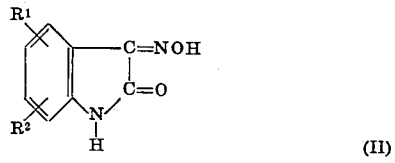

where $R^1$ and $R^2$ have the meanings given above, in the presence of a basic compound at a temperature of more than 130° C.

As compared with prior art methods, the process according to this invention gives o-aminobenzonitriles in good yields and high purity by a simpler and more economical method. The process may be carried out without disturbance in standard apparatus, for example stirred vessels, at considerably lower temperatures and without solvent or with smaller amounts of solvent. Production of subatmospheric pressure required for distillation is much simpler and special separators are not required.

Preferred starting materials are isatin β-oximes having the general formula (II) where the radicals $R^1$ and $R^2$ may be identical or different and each denotes a hydrogen atom, a chlorine atom, a bromine atom or an alkyl radical having from one to four carbon atoms. For example isatin β-oxime itself and the following derivatives are suitable: 5-methylisatin β-oxime, 5-isobutylisatin β-oxime, 5-chloroisatin β-oxime, 5,7-dibromoisatin β-oxime and 4-methyl-5-chloro-isatin β-oxime.

Thermal decomposition of the starting material is carried out in the presence of a basic compound. Preferred basic compounds are alkali metal compounds or alkaline earth metal compounds or mixtures of the same, for example hydroxides, oxides, amides; salts of weak or polybasic inorganic or organic acids such as acetates, propionates, carbonates, bicarbonates; alcoholates, glycolates, ether glycolates such as methylates, ethylates, ethylene glycolates, nonaethylene glycolates, tripropylene glycolates, diethylenemono glycolate monomethyl ether and other alkylene glycolates (which may be etherified on one hydroxy group), particularly ethylene glycolates and propylene glycolates. Sodium, potassium, calcium, barium and magnesium are preferred as cations for the said compounds. As a rule the basic compound or mixture of basic compounds is used in an amount of from 0.01 to 10 percent preferably from 0.05 to 5 percent, by weight with reference to starting material (II).

The reaction is carried out at a temperature of more than 130° C., generally at from 130° to 200° C. and preferably at from 140° to 170° C., at atmospheric or superatmospheric pressure, continuously or batchwise. It is advantageous to use organic solvents which are inert under the reaction conditions. Since the o-aminobenzonitriles often can be separated most favorably from the reaction mixture by distillation, it is especially suitable to use solvents whose boiling point is sufficiently different from the o-aminobenzonitrile in question. The solvent preferably has a boiling point which is higher than that of the o-aminobenzonitrile prepared therein, for example above 260° C. at standard pressure. Often only a small amount of solvent is necessary because as the reaction proceeds the o-aminobenzonitrile formed serves as a solvent. Examples of suitable solvents are hydrocarbons such as paraffin oil, petroleum fractions of high boiling point, monoethylene glycols, polyethylene glycols, preferably based on ethylene oxide or propylene oxide, having a boiling point of more than 300° C. and a molecular weight of less than 1000 such as hexaethylene glycol, nonaethylene glycol; monoethylene or polyethylene glycol dialkyl ethers such as hexaethylene or nonaethylene glycol dimethyl ether, dipropyl ether, diethylhexyl ether or mixtures thereof.

The reaction may be carried out as follows:

a mixture of starting material (II) and a basic compound, with or without a solvent, is heated to reaction temperature while mixing well and the mixture is kept at this temperature for some time. It is advantageous to place only a portion of the starting material in the reactor and then to introduce the remainder into the mixture at the reaction temperature at such a rate that the temperature of the reaction chamber is kept constant, if necessary with additional cooling or heating. The commencement of the reaction is evidenced by the disengagement of carbon dioxide. When carbon dioxide is no longer evolved, the end product is advantageously removed from the reactor by distillation.

The temperature at which elimination of carbon dioxide takes place at an adequate rate is generally from 50° to 100° C. lower than the temperature used in processes carried out without basic compounds as catalysts.

It is also possible to carry out the process continuously by feeding solvent, catalyst and isatin β-oxime into a decomposition vessel kept at the reaction temperature, continuously withdrawing a portion of the reaction mixture and supplying it to a distillation unit while isatin β-oxime, catalyst and if necessary solvent are continuously fed in.

The compounds which can be prepared by the process are valuable starting materials for the production of dyes and pesticides. For example the corresponding diazo compound can be prepared from o-aminobenzonitrile, this may be reacted with tin chloride to form the 3-aminoindazole (J. Am. Chem. Soc., 65, 1804 (1943)) and from this, by the process according to British Patent Specification No. 1,791,932, a dye salt may be prepared which is soluble in water and which will dye cotton mordanted with tannic acid.

The invention is illustrated by the following Examples.

The parts given in the Examples are parts by weight.

EXAMPLE 1

Fifty parts of nonaethylene glycol, 0.5 part of sodium methylate and 10 parts of isatin β-oxime are heated to 150° to 160° C. while stirring. After evolution of carbon dioxide has begun, another 690 parts of isatin β-oxime is introduced at from 140° to 150° C. with a metering extruder. When the evolution of carbon dioxide has ceased, the o-aminobenzonitrile formed is distilled off from the reaction mixture. 443.4 parts (equivalent to 87 percent of the theory) of pure o-aminobenzonitrile is obtained having a boiling point (at 14 mm) of from 135° to 139° C. and a freezing point of from 48° to 50° C.

EXAMPLE 2

0.2 part of sodium is dissolved in 60 parts of nonaethylene glycol at from 80° to 90° C. Then 10 parts of isatin β-oxime is added and the whole is heated to 150° to 160° C. so that elimination of carbon dioxide begins. Another 315 parts of isatin β-oxime is then introduced at the same temperature into the mixture and stirred for another 10 minutes. Distillation of the reaction mixture gives 205 parts (86.5 percent of the theory) of 98 percent 2-aminobenzonitrile.

EXAMPLE 3

A mixture of 20 parts of 5-methylisatin β-oxime, 3 parts of anhydrous potassium carbonate and 250 parts of nonaethylene glycol is heated to about 165° C. while stirring. After evolution of carbon dioxide has begun, another 510 parts of 5-methylisatin β-oxime is slowly introduced while the temperature is kept at from 160° to 170° C. Evolution of carbon dioxide ceases about 10 minutes after the addition is completed and then the reaction mixture is distilled. 316 parts (76.5 percent of the theory) of 96 percent 5-methyl-2-aminobenzonitrile is obtained having a boiling point (at 1 mm) of from 115° to 118° C. and a freezing point of from 58° to 60° C.

EXAMPLE 4

Three hundred parts of nonaethylene glycol, 10 parts of 5-chloroisatin β-oxime and 15 parts of sodium acetate (anhydrous) are heated to 165° to 170° C. while stirring. Reaction begins at this temperature and is evidenced by the evolution of carbon dioxide. During 50 minutes at from 160° to 170° C. another 190 parts of 5-chloroisatin β-oxime is introduced. The mixture is then stirred for another 10 minutes at from 160° to 170° C. and then distilled at a pressure of from 1 to 2 mm. The distillate which is kept liquid in a heated receiver is stirred into from 400 to 500 parts of water, allowed to cool, filtered and dried. 115 parts (74 percent of the theory) of pure 2-amino-5-chlorobenzonitrile is obtained having a freezing point of from 96° to 97° C.

EXAMPLE 5

Ninety parts of 5-methylisatin β-oxime is decomposed in 30 parts of paraffin oil in the presence of 0.6 part of sodium methylate during 30 minutes at from 175° to 180° C. The distillation which follows gives 52.5 parts (73 percent of the theory) of 94 percent 5-methyl-2-aminobenzonitrile.

We claim:

1. A process for the production of o-aminobenzonitriles having the formula:

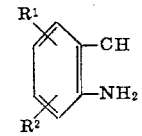

(I)

where $R^1$ and $R^2$ may be identical or different and each denotes a hydrogen atom, a chlorine atom, a bromine atom or an alkyl radical having one to four carbon atoms wherein an isatin β-oxime having the formula:

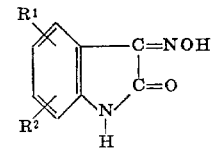

(II)

where $R^1$ and $R^2$ have the above meanings is decomposed in admixture with an alkali metal or alkaline earth metal basic catalyst at a temperature of 130° C. to 200° C.

2. A process as claimed in claim 1 carried out in the presence of basic catalyst in an amount of from 0.01 to 10 percent by weight with reference to the starting material (II).

3. A process as claimed in claim 1 carried out in the presence of said basic catalyst in an amount of from 0.05 to 5 percent by weight with reference to the starting material (II).

4. A process as claimed in claim 1 carried out at a temperature of from 140° to 170° C.

5. A process as claimed in claim 1 carried out in the presence of an inert organic solvent having a boiling point above 260° C. at standard pressure.

6. A process as claimed in claim 5 wherein said solvent is a hydrocarbon having said boiling point, a monoethylene glycol, a polyethylene glycol based on ethylene oxide or propylene oxide and having a boiling point of more than 300° C. and a molecular weight of less than 1,000 or a dialkyl ether of said polyethylene glycol.

7. A process as claimed in claim 1 carried out in the presence of an inert organic solvent based on ethylene oxide or propylene oxide and having a boiling point of more than 300° C. and a molecular weight of less than 1000.

8. A process as claimed in claim 1 wherein said basic compound is a hydroxide, oxide, amide, acetate, propionate, carbonate, bicarbonate, alcoholate, alkylene glycolate or monoether thereof with a sodium, potassium, calcium, barium or magnesium cation.

* * * * *

UNITED STATES PATENT OFFICE
CERTIFICATE OF CORRECTION

Patent No. 3,665,029　　　　　　　　Dated May 23, 1972

Inventor(s) Helmut Goerth and Herbert Armbrust

It is certified that error appears in the above-identified patent and that said Letters Patent are hereby corrected as shown below:

First page, right-hand column, in the references, under "OTHER PUBLICATIONS", "S. Chem. Soc." should read -- J. Chem. Soc. --.

Column 2, line 71, "1,791,932" should read -- 791,932 --.

Signed and sealed this 5th day of December 1972.

(SEAL)
Attest:

EDWARD M. FLETCHER, JR.　　　　　　　ROBERT GOTTSCHALK
Attesting Officer　　　　　　　　　　Commissioner of Patents